United States Patent
Isomoto et al.

(10) Patent No.: US 6,664,324 B2
(45) Date of Patent: Dec. 16, 2003

(54) RESIN SOLUTION COMPOSITION FOR PAINTS OR ADHESIVES

(75) Inventors: Kenichiro Isomoto, Takasago (JP); Takafumi Masuda, Takasago (JP); Shoji Maekawa, Takasago (JP)

(73) Assignee: Toyo Kasei Kogyo Company Limited, Osaka (JP)

( * ) Notice: Subject to any disclaimer, the term of this patent is extended or adjusted under 35 U.S.C. 154(b) by 32 days.

(21) Appl. No.: 09/984,807

(22) Filed: Oct. 31, 2001

(65) Prior Publication Data

US 2002/0120038 A1 Aug. 29, 2002

(30) Foreign Application Priority Data

Dec. 15, 2000 (JP) .......................................... 2000-381976
Sep. 6, 2001 (JP) .......................................... 2001-270330

(51) Int. Cl.[7] ............................................... C08L 51/06
(52) U.S. Cl. ........................... 524/504; 524/80; 524/81; 524/832; 525/301
(58) Field of Search ..................... 524/504, 832, 524/80, 81; 525/301

(56) References Cited

U.S. PATENT DOCUMENTS

| 4,599,385 | A | * | 7/1986 | Clayton et al. | ............. | 525/285 |
| 5,358,785 | A | * | 10/1994 | Akao et al. | .................. | 428/349 |
| 5,663,229 | A | * | 9/1997 | Presenz et al. | ............. | 524/399 |
| 5,821,301 | A | * | 10/1998 | Tsuneka et al. | ................ | 525/64 |
| 6,310,134 | B1 | * | 10/2001 | Templeton et al. | ......... | 524/531 |
| 6,462,130 | B2 | * | 10/2002 | Fujino et al. | .................. | 525/66 |

FOREIGN PATENT DOCUMENTS

| JP | 4-27245 | 5/1992 |

* cited by examiner

*Primary Examiner*—David W. Wu
*Assistant Examiner*—Henry S. Wu
(74) *Attorney, Agent, or Firm*—Wenderoth, Lind & Ponack, L.L.P.

(57) ABSTRACT

The present invention relates to a resin solution composition for paints or adhesives which comprises an acid-modified butene-1/α-olefin copolymer obtained by modifying a butene-1/α-olefin copolymer with an unsaturated carboxylic acid or an acid anhydride thereof. The butene-1/α-olefin copolymer comprises, as polymerizable components, 65 to 85 mol % butene-1 component and 15 to 35 mol % α-olefin component having 2 to 8 carbon atoms other than butene-1 component. The acid-modified butene-1/α-olefin copolymer comprises the unsaturated carboxylic acid or the anhydride thereof in a proportion of 0.5 to 5% by weight. In this resin solution composition, the acid-modified butene-1/α-olefin copolymer is dissolved in an organic solvent, in a solid content of 10 to 30% by weight.

5 Claims, No Drawings

RESIN SOLUTION COMPOSITION FOR PAINTS OR ADHESIVES

FIELD OF THE INVENTION

The present invention relates to a resin solution composition which comprises an acid-modified butene-1/α-olefin copolymer and which is suitable for paint or adhesive applications.

BACKGROUND OF THE INVENTION

Crystalline polybutene-1, which has excellent tensile characteristics, etc., is traditionally used as a material for pipes and films. However, being sparingly soluble in organic solvents, crystalline polybutene-1 is not readily usable for paint or adhesive applications except by means of powder coating.

In the meantime, with regard to a coating-forming agent usable as a component of solution-type paints, adhesives or the like, a modified polybutene-1 has been developed to take advantage of the characteristics of crystalline polybutene-1 and to ensure remarkable coating properties. To give an example, Japanese Patent publication No. Hei 4-27245 proposes a modified polybutene-1 obtained by graft-modifying polybutene-1 with an unsaturated carboxylic acid or an anhydride thereof.

Nevertheless, a solution composition of this modified polybutene-1 lacks storage stability. When stored at 25° C., the solution composition gelates in as short as 10 days, only to degrade the solution fluidity. For this reason, such a composition is not suitable for use as paints, adhesives or the like, where a coating should be formed in a uniform thickness.

Further, in paint or adhesive applications, this modified polybutene-1, which has a high melting temperature, cannot ensure satisfactory coating properties (e.g. adhesion property, water resistance, gasohol resistance) after low-temperature baking or heat sealing is practiced at 100° C. or lower.

Hence, taking advantage of superior characteristics of a modified polybutene-1, the present invention intends to provide a resin solution composition suitable for paint or adhesive applications, which composition can show good storage stability and form a coating with remarkable properties as a paint or adhesive, with the resin having a low melting temperature.

SUMMARY OF THE INVENTION

In order to achieve the above object, the inventors of the present invention have made intensive researches and completed the present invention.

To be specific, the present invention relates to a resin solution composition for paints or adhesives which comprises an acid-modified butene-1/α-olefin copolymer obtained by modifying a butene-1/α-olefin copolymer with an unsaturated carboxylic acid or an acid anhydride thereof. The butene-1/α-olefin copolymer comprises 65 to 85 mol % butene-1 component and 15 to 35 mol % α-olefin component as polymerizable components, the α-olefin component having 2 to 8 carbon atoms and being other than butene-1 component. The acid-modified butene-1/α-olefin copolymer comprises the unsaturated carboxylic acid or the acid anhydride thereof in a proportion of 0.5 to 5% by weight, and wherein the acid-modified butene-1/α-olefin copolymer is dissolved in an organic solvent, in a solid content of 10 to 30% by weight.

In an embodiment of the present invention, the acid-modified butene-1/α-olefin copolymer may have a weight average molecular weight (Mw) in the range of 50,000 to 200,000.

In another embodiment of the present invention, the acid-modified butene-1/α-olefin co-polymer may have a melting temperature in the range of 70° C. to 100° C.

In still another embodiment of the present invention, the organic solvent may comprise an alicyclic hydrocarbon having 5 to 8 carbon atoms in a proportion of 10 to 90% by weight.

In yet another embodiment of the present invention, the organic solvent may comprise an aromatic hydrocarbon in a proportion of 10 to 90% by weight.

In further another embodiment of the present invention, the resin solution composition may further comprise, as a curing agent, a compound having two or more epoxy groups per molecule.

DETAILED DESCRIPTION OF THE INVENTION

A butene-1/α-olefin copolymer used in the present invention comprises, as polymerizable components, 65 to 85 mol % butene-1 component, and 15 to 35 mol % $C_2$–$C_8$ α-olefin component other than butene-1 component.

As the $C_2$–$C_8$ α-olefin component other than butene-1 component, there may be mentioned ethylene, propylene, hexene-1, heptene-1, octene-1, 4-methylpentene-1 and the like, which may be used alone or in combination. Specific examples of the butene -1/α-olefin copolymer include, for example, butene-1/ethylene copolymer, butene-1/propylene copolymer, butene-1/ethylene/propylene terpolymer and butene-1/ethylene/octene-1 terpolymer. Of the above-mentioned α-olefin components, ethylene, propylene and octene-1 are suitable because of the versatility of copolymers.

The content of butene-1 is in the range of 65 to 85 mol %, preferably 70 to 80 mol %. The content of the α-olefin component ranges from 15 to 35 mol %, preferably from 20 to 30 mol %. Where the butene-1 content is less than 65 mol % (where the content of the α-olefin component exceeds 35 mol %), the final acid-modified butene-1/α-olefin copolymer has a low mechanical strength and a weak cohesive force. As a result, the coating shows an inferior adhesion property to polyolefins. On the other hand, where the butene-1 content is over 85 mol % (where the content of the α-olefin component is less than 15 mol %), the final acid-modified butene-1/α-olefin copolymer has a melting temperature of 100° C. or higher. In this case, the coating shows a poor adhesion property after low-temperature baking or heat sealing is practiced at 100° C. or lower in paint or adhesive applications. Besides, depending on the molecular weight, the final acid-modified butene-1/α-olefin copolymer shows an insufficient solubility in an organic solvent and, hence, a poor storage stability. It should be noted that the melting temperature of a polybutene-1 homopolymer is in the range of 122 to 130° C., whereas that of a polybutene-1 homopolymer modified with an unsaturated carboxylic acid or its anhydride ranges from 110 to 125° C.

This butene-1/α-olefin copolymer can be modified with an unsaturated carboxylic acid or an anhydride thereof to give an acid-modified butene-1/α-olefin copolymer.

The unsaturated carboxylic acid or its anhydride used herein includes unsaturated carboxylic acids such as acrylic acid, methacrylic acid, maleic acid, itaconic acid and citraconic acid; unsaturated carboxylic anhydrides such as maleic anhydride, itaconic anhydride, citraconic anhydride and endomethylenetetrahydrophthalic anhydride. They may be used alone or in combination. Considering the adhesion property of the coating and the price, maleic anhydride is particularly suitable.

This acid-modified butene-1/α-olefin copolymer contains the unsaturated carboxylic acid or its anhydride in a proportion of 0.5 to 5% by weight, preferably 1 to 4% by weight. If the proportion of the unsaturated carboxylic acid or its anhydride is below 0.5% by weight, the acid-modified butene-1/α-olefin copolymer not only shows a poor solubility in an organic solvent but also limits the adhesion property of the coating. Conversely, where the proportion of the unsaturated carboxylic acid or its anhydride exceeds 5% by weight, the coating properties are unsatisfactory. In particular, increase of polarity degrades the water resistance.

The butene-1/α-olefin copolymer is modified with the unsaturated carboxylic acid or its anhydride in a known manner. In a typical reaction, the butene-1/α-olefin copolymer is allowed to react with the unsaturated carboxylic acid or its anhydride in the presence or absence of a solvent (e.g. toluene, xylene) with or without addition of a radical initiator (e.g. benzoyl peroxide, dicumyl peroxide, di-tert-butyl peroxide, lauroyl peroxide, cumene hydroxyperoxide, 2,2'-azobis(isobutyronitrile)). This reaction is carried out under heating at as high as 70 to 250° C.

Preferably, the resulting acid-modified butene-1/α-olefin copolymer has a weight average molecular weight (Mw) ranging from 50,000 to 200,000, particularly from 60,000 to 150,000. If the Mw is below 50,000, the acid-modified butene-1/α-olefin copolymer may lack a cohesive force, which causes the coating to show a poor adhesion property. On the other hand, the acid-modified butene-1/α-olefin copolymer with a Mw over 200,000 decreases the fluidity of a resin solution composition which contains the copolymer in a dissolved state. Insufficient fluidity makes formation of a smooth adhesion layer difficult, when this resin solution composition is coated and dried under heating. In the present invention, the Mw is measured with the use of gel permeation chromatography (GPC), based on polystyrenes.

The melting temperature of the acid-modified butene-1/α-olefin copolymer is preferably in the range of 70 to 100° C. The copolymer with a melting temperature below 70° C. may decrease the heat resistance of the coating. On the contrary, where the copolymer has a melting temperature over 100° C., the coating may show an inferior adhesion property after low-temperature baking or heat sealing is practiced at 100° C. or lower in paint or adhesive applications. To put it another way, in paint or adhesive applications (particularly, adhesive applications), it is desirable to bake or heat-seal the coating at a temperature higher than the melting temperature of the acid-modified butene-1/α-olefin copolymer. The melting temperature mentioned in the present invention is based on the value measured by a differential scanning calorimeter.

In the acid-modified butene-1/α-olefin copolymer, the crystallinity is not particularly limited. For example, a preferable crystallinity is in the range of 30 to 60%, as obtained by splitting the waveform measured by the wide-angle X-ray diffractometry, in order that the acid-modified butene-1/α-olefin copolymer can retain a sufficient cohesive force and a proper solubility in an organic solvent.

The thus obtained acid-modified butene-1/α-olefin copolymer is dissolved in an organic solvent to give a resin solution composition. The organic solvent used herein includes alicyclic hydrocarbons, aromatic hydrocarbons and the like. Desirable alicyclic hydrocarbons are those with 5 to 8 carbon atoms such as cyclopentane, cyclohexane, methylcyclohexane, ethylcyclohexane and cycloheptane, each of which has a boiling point acceptable for the organic solvent. Examples of the aromatic hydrocarbons are toluene, xylene, and other aromatic petroleum-mixed solvents which are sold on the market.

The alicyclic hydrocarbons and the aromatic hydrocarbons mentioned above are good solvents to the acid-modified butene-1/α-olefin copolymer, which is hydrophobic. If any of these solvents is used alone, however, the solution of the acid-modified butene-1/α-olefin copolymer may gelate within 10 days of storage at 25° C. or lower. Hence, in the present invention, it is preferable to use a mixed solvent composed of an alicyclic hydrocarbon and an additional organic solvent, or a mixed solvent composed of an aromatic hydrocarbon and an additional organic solvent.

The additional organic solvent for constituting the mixed solvent includes not only the alicyclic hydrocarbons and the aromatic hydrocarbons mentioned above, but also aliphatic hydrocarbons such as hexane, heptane and mineral oils; esters such as ethyl acetate and butyl acetate; ketones such as methyl ethyl ketone and methyl isobutyl ketone; alcohols such as ethanol and 2-propanol; cellosolves such as ethyl cellosolve and butyl cellosolve. These organic solvents may be used alone or in combination. Above all, organic solvents having a carbonyl group (i.e. esters and ketones) are preferable, because they can surely prevent the solution of the acid-modified butene-1/α-olefin copolymer from gelating during along period of storage at 25° C. or lower. These solvents are also recommended in terms of miscibility with the alicyclic hydrocarbons or the aromatic hydrocarbons and solubility of the acid-modified butene-1/α-olefin copolymer. Such esters and ketones, which have high affinity for a polar group of the acid-modified butene-1/α-olefin copolymer (i.e. carboxyl group or acid anhydride group), are considered to enhance the dispersability of the copolymer in the organic solvent.

The mixing ratio of the alicyclic hydrocarbon or the aromatic hydrocarbon relative to the additional organic solvent may vary, depending on the amount of unsaturated carboxylic acid or its anhydride contained in the acid-modified butene-1/α-olefin copolymer. By way of example, where the mixed solvent comprises an alicyclic hydrocarbon and an additional organic solvent, the content of the alicyclic hydrocarbon is preferably in the range of 10 to 90% by weight, particularly 20 to 80% by weight. Likewise, in the mixed solvent comprising an aromatic hydrocarbon and an additional organic solvent, the content of the aromatic hydrocarbon is preferably in the range of 10 to 90% by weight, particularly 20 to 80% by weight. If the alicyclic hydrocarbon content is lower than 10% by weight, the solution of the acid-modified butene-1/α-olefin copolymer may gelate in the opaque state within 10 days of storage at 25° C. or lower. On the other hand, if the alicyclic hydrocarbon content is over 90% by weight, the solution of the acid-modified butene-1/α-olefin copolymer may turn into a highly viscous transparent solution, and gelate in the transparent state within 10 days of storage at 25° C. or lower. Similar tendencies are recognized when the aromatic hydrocarbon is employed in place of the alicyclic hydrocarbon.

In the resin solution composition, the solid content of the acid-modified butene-1/α-olefin copolymer is in the range of 10 to 30% by weight, preferably 15 to 25% by weight. A solid content lower than 10% by weight, or an organic solvent content of over 90% by weight, is unsuitable for paint or adhesive applications, in view of the cost and the recent issues on Volatile Organic Compound (VOC) control. Besides, during the preparation of paints, pigments may not disperse well in a resin solution composition with such a low solid content. On the contrary, with a solid content over 30% by weight, the solution of the acid-modified butene-1/α-olefin copolymer may gelate in the opaque state within 10 days of storage at 25° C. or lower.

Additionally, the resin solution composition of the present invention may comprise, as a curing agent, a compound having two or more epoxy groups per molecule. This epoxy group-containing compound helps to further enhance the properties of the coating. Nonetheless, due to safety and hygiene problems, some kinds of epoxy group-containing compounds cannot be employed as a material for paints or adhesives. With this point borne in mind, the epoxy group-containing compounds are properly selected in accordance with intended applications.

As the epoxy group-containing compounds usable in this invention, there may be mentioned bisphenol A-type epoxy resins obtained by a condensation reaction of bisphenol A with epichlorohydrin; glycidyl ethers of polyhydric alcohols, such as ethylene glycol glycidyl ether, propylene glycol glycidyl ether and trimethylolpropane triglycidyl ether; polymers which contain glycidyl (meth)acrylate as a polymerizable component, and the like.

The added amount of epoxy group-containing compound is not strictly limited, and preferably such that the amount of epoxy is fivefold equivalent or less relative to the amount of unsaturated carboxylic acid or anhydride thereof contained in the acid-modified butene-1/α-olefin copolymer. If the epoxy group-containing compound exceeds this range, the coating may show undesirable properties (in particular, the adhesion property to polyolefins). At the same time, considering the compatibility between the acid-modified butene-1/α-olefin copolymer and the epoxy group-containing compound, the storage stability may be adversely affected.

Unless departing from the object of the present invention, the resin solution composition of the present invention may contain, where necessary, resins used for paints or adhesives such as alkyd resins, urethane resins and acrylic resins; pigments, stabilizers and other components.

EXAMPLES

The present invention is described below in further detail by means of Examples and Comparative Examples. However, they should not be construed to limit the present invention.

Production Example 1

Production of an Acid-Modified Butene-1/α-olefin Copolymer (a)

Into an autoclave, there were charged 100 parts by weight of butene-1/α-olefin copolymer (butene-1 content: 70 mol %, ethylene content: 30 mol %, melt flow rate at 230° C.: 3.7 g/10 mins.), 300 parts by weight of toluene and 15 parts by weight of maleic anhydride. Then, the atmosphere inside the autoclave was displaced with nitrogen. Thereafter, with the temperature in the system being kept at 140° C., 1 part by weight of dicumyl peroxide was added over 3 hours. On completion of the addition, the mixture was stirred for three hours, and then cooled down to 110° C. The cooled mixture was added to 1,000 parts by weight of acetone (30° C.) to precipitate the resin. The resin precipitate was collected by filtration and washed with 500 parts by weight of acetone to remove unreacted maleic anhydride and other by-products. Finally, the washed product was dried to give an acid-modified butene-1/α-olefin copolymer (a).

This acid-modified butene-1/(α-olefin copolymer (a) had a Mw of 62,000, and its maleic anhydride content was 3.5% by weight. The melting temperature of the copolymer (a) was 71° C., as measured by a differential scanning calorimeter.

Production Example 2

Production of an Acid-Modified Butene-1/α-olefin Copolymer (b)

Into an autoclave, there were charged 100 parts by weight of butene-1/α-olefin copolymer (butene-1 content: 80 mol %, propylene content: 20 mol %, melt flow rate at 230° C.: 6.0 g/10 mins.), 300 parts by weight of toluene and 5 parts by weight of endomethylenetetrahydrophthalic anhydride. Thereafter, the process of PRODUCTION EXAMPLE 1 was followed to obtain an acid-modified butene-1/α-olefin copolymer (b).

This acid-modified butene-1/α-olefin copolymer (b) had a Mw of 148,000, and the content of endomethylenetetrahydrophthalic anhydride was 0.60% by weight. The melting temperature of the copolymer (b) was 98° C., as measured by a differential scanning calorimeter.

Production Example 3

Production of an Acid-Modified Butene-1 Polymer (c)

Into an autoclave, there were charged 100 parts by weight of butene-1 polymer (butene-1 content: 100 mol %, melt flow rate at 230° C.: 4.0 g/10 mins.), 300 parts by weight of toluene and 12 parts by weight of maleic anhydride. Thereafter, the process of PRODUCTION EXAMPLE 1 was followed to obtain an acid-modified butene-1 polymer (c).

The acid-modified butene-1 polymer (c) had a Mw of 120,000, and its maleic anhydride content was 1.5% by weight. The melting temperature of the polymer (c) was 120° C., as measured by a differential scanning calorimeter.

Next, resin solution compositions for present Examples were prepared with the use of either the acid-modified butene-1/α-olefin copolymer (a) or (b).

Example 1

Into a four-neck flask, 20 parts by weight of acid-modified butene-1/α-olefin copolymer (a) were fed together with organic solvents composed of 72 parts by weight of cyclohexane and 8 parts by weight of butyl acetate (weight ratio=90:10). This mixture was heated at 60° C. for 30 minutes to dissolve the copolymer (a). The solution was cooled to 30° C. to give a colorless transparent resin solution composition. It should be noted that the compound containing two or more epoxy groups per molecule was not added to this resin solution composition.

Examples 2 to 14

The process of EXAMPLE 1 was followed to prepare resin solution compositions, except for changing the kind of acid-modified butene-1/α-olefin copolymer as well as the kind and mixing ratio of organic solvents as prescribed in Table 1. In addition, with regard to EXAMPLES 4, 5, 12 and 13, Compound A or B was added as the compound containing two or more epoxy groups per molecule. In Table 1, compound A indicates a bisphenol A-type epoxy resin (epoxy equivalent: 190 g/eq), and Compound B refers to trimethylolpropane triglycidyl ether (epoxy equivalent: 150 g/eq). The added amount of Compound A or B was such that the amount of epoxy was equivalent relative to the amount of unsaturated carboxylic acid or anhydride thereof in the acid-modified butene-1/α olefin copolymer.

In the resin solution compositions according to EXAMPLES 1 to 14 mentioned above, the solid content of the acid-modified butene-1/α-olefin copolymers was all adjusted to 20% by weight, so as to compare their storage stability on the equal basis.

TABLE 1

| EX-AM-PLES | Acid-modified polymer | Organic solvents (weight ratio) | Epoxy compound |
|---|---|---|---|
| 1 | a | cyclohexane:butyl acetate = 90:10 | Not added |
| 2 | a | cyclohexane:butyl acetate = 50:50 | Not added |
| 3 | a | cyclohexane:butyl acetate = 10:90 | Not added |
| 4 | a | cyclohexane:butyl acetate = 50:50 | Compound A |
| 5 | a | cyclohexane:butyl acetate = 50:50 | Compound B |
| 6 | a | methylcyclohexane:methyl ethyl ketone = 80:20 | Not added |
| 7 | a | methylcyclohexane:methyl ethyl ketone = 30:70 | Not added |
| 8 | a | toluene:2-propanol = 90:10 | Not added |
| 9 | a | xylene:ethyl acetate = 80:20 | Not added |
| 10 | b | cyclohexane:methyl isobutyl ketone = 80:20 | Not added |
| 11 | b | cyclohexane:methyl isobutyl ketone = 20:80 | Not added |
| 12 | b | cyclohexane:methyl isobutyl ketone = 80:20 | Compound A |
| 13 | b | cyclohexane:methyl isobutyl ketone = 80:20 | Compound B |
| 14 | b | toluene:butyl acetate = 50:50 | Not added |

Samples from the resin solution compositions of EXAMPLES 1 to 14 were evaluated for storage stability, peel strength, interlayer adhesion, water resistance and gasohol resistance. The results are compiled in Table 2.

TABLE 2

| EX-AM-PLES | Storage stability (1) | Storage stability (2) | Peel Strength (N/mm) (1) | Peel Strength (N/mm) (2) | Interlayer adhesion | Water resistance | Gasohol resistance (min.) |
|---|---|---|---|---|---|---|---|
| 1 | good | good | 0.9 | 0.5 | 100 | good | 55 |
| 2 | good | good | 0.9 | 0.5 | 100 | good | 60 |
| 3 | good | good | 0.8 | 0.5 | 100 | good | 60 |
| 4 | fair | fair | 1.7 | 1.1 | 100 | good | 120 or over |
| 5 | fair | fair | 1.6 | 1.2 | 100 | good | 120 or over |
| 6 | good | good | 0.8 | 0.4 | 100 | good | 50 |
| 7 | good | good | 0.9 | 0.5 | 100 | good | 45 |
| 8 | good | good | 0.8 | 0.4 | 100 | good | 50 |
| 9 | good | good | 0.9 | 0.5 | 100 | good | 60 |
| 10 | good | good | 0.7 | 0.6 | 100 | good | 45 |
| 11 | good | good | 0.7 | 0.6 | 100 | good | 50 |
| 12 | fair | fair | 1.6 | 1.3 | 100 | good | 120 or over |
| 13 | fair | fair | 1.5 | 1.4 | 100 | good | 120 or over |
| 14 | good | good | 0.8 | 0.6 | 70 | good | 60 |

Evaluation Methods

1. Storage Stability (1)

Each resin solution composition was weighed out by 60 ml and put in a 100-ml sample bottle made of transparent glass. The sample bottle was left in a thermostatic chamber at 25° C. The state of each composition was observed after 7 and 30 days of standing. Storage stability was considered "good" if the composition remained transparent and kept good fluidity after 30 days, "fair" if the composition kept fluidity but turned opaque after 30 days, and "bad" if the composition gelated after 7 days.

2. Storage stability (2)

Each resin solution composition was weighed out by 60 ml and put in a 100-ml sample bottle made of transparent glass. The sample bottle was left in a thermostatic chamber at 5° C. The state of each composition was observed after 3 and 10 days of standing. Storage stability was considered "good" if the composition remained transparent and kept good fluidity after 10 days, "fair" if the composition kept fluidity but turned opaque after 10 days, and "bad" if the composition gelated after 3 days.

3. Peel Strength (1)

Using a bar coater, each resin solution composition was applied on a 25-μm-thick aluminum foil (15 mm wide) such that the coating, when dried, had a thickness of 3 μm. This aluminum foil was dried with air and then heated in a hot-air drier at 100° C. for 10 seconds to give a coated foil with a coating of uniform thickness. The coated foil was heat-sealed with a 250-μm-thick PP (polypropylene) sheet (15 mm wide) at 100° C. for one second under a pressure of 0.3 MPa, with the coating on the coated foil being in contact with the PP sheet. After the heat-sealed product was stored at 25° C. for 24 hours, its aluminum foil was peeled off in 180° direction using a tensile tester, under a temperature of 25° C. and at a peeling speed of 200 mm/min. The thus measured peel strength was converted into the unit of N/mm.

4. Peel Strength (2)

The peel strength was measured in the same method as described in Peel Strength (1), except that a 250-μ-thick PP sheet was employed in place of the aluminum foil.

5. Interlayer Adhesion

Onto a polypropylene plate (100 mm×50 mm×2 mm) which was thoroughly cleaned with isopropyl alcohol, each resin solution composition was applied using a bar coater such that the coating, when dried, had a thickness of 5 μm. The plate was dried first with air and then with hot air at 80° C. for 10 minutes. On this primer layer, a polyurethane paint (Retan PG80, manufactured by KANSAI PAINT CO., LTD., the base resin and the curing agent were blended in prescribed amounts) was air-sprayed such that the coating, when dried, had a thickness of 40 μm. This plate was dried first with air and then with hot air at 80° C. for 30 minutes to give a polyurethane-painted test piece. After the polyurethane-painted test piece was stored for 24 hours at 25° C., the polyurethane-painted surface was scored into 100 grids using a cutter, with each cut being 1 mm apart from the others and reaching the PP plate. A piece of cellophane tape (manufactured by NICHIBAN CO., LTD.) was adhered on the scored surface and peeled off in 180° direction. The evaluation was expressed by the count of grids whose coating remained unpeeled (the count of grids in which both the primer layer and the polyurethane paint layer remained unpeeled).

6. Water Resistance

The polyurethane-painted test piece, prepared for the interlayer adhesion test described above, was stored for 24 hours at 25° C. This test piece was immersed in 40° C. water for ten days to see whether blister developed on the coating (the primer layer and/or the polyurethane paint layer). The test piece which had gone through the water resistance test was also subjected to the interlayer adhesion test. The evaluation "good" was given if no blister developed on the coating and, at the same time, the interlayer adhesion remained good after the water resistance test. In contrast, the evaluation "bad" was given either if blister developed on the coating or if the interlayer adhesion was poor after the water resistance test.

7. Gasohol Resistance

The polyurethane-painted test piece, prepared for the above interlayer adhesion test, was stored for 7 days at 25° C. This test piece was immersed at 20° C. in a gasohol blend (regular gasoline: ethanol=90:10 (weight ratio)). In this circumstance, the time was measured after the coating (the primer layer and/or the polyurethane paint layer) started to peel off from the edge of the polyurethane-painted test piece, until the peeling reached 5 mm inside of the edge. The gasohol resistance was represented by the thus measured time.

Comparative Examples 1 to 5

Resin solution compositions were obtained in the same manner as in EXAMPLE 1, except for replacing acid-modified butene-1/α-olefin copolymer (a) with acid-modified butene-1 polymer (c), and also changing the kind and mixing ratio of organic solvents as prescribed in Table 3. In the resin solution compositions according to COMPARATIVE EXAMPLES 1 to 5, the solid content of the acid-modified butene-1 polymer (c) was all adjusted to 20% by weight, so as to compare their storage stability on the equal basis.

TABLE 3

| COMP. EXS. | Acid modified polymer | Organic solvents (ratio in weight parts) | Epoxy compound |
|---|---|---|---|
| 1 | c | cyclohexane:butyl acetate = 80:20 | Not added |
| 2 | c | cyclohexane:butyl acetate = 50:50 | Not added |
| 3 | c | cyclohexane:butyl acetate = 20:80 | Not added |
| 4 | c | cyclohexane = 100 | Not added |
| 5 | c | toluene = 100 | Not added |

Samples from the resin solution compositions of COMPARATIVE EXAMPLES 1 to 5 were evaluated for storage stability, peel strength, interlayer adhesion, water resistance and gasohol resistance. The results are compiled in Table 4.

TABLE 4

| COMP. EXAM- | Storage Stability | | Peel Strength (N/mm) | | Interlayer | Water | Gasohol resistance |
|---|---|---|---|---|---|---|---|
| PLES | (1) | (2) | (1) | (2) | adhesion | resistance | (min.) |
| 1 | fair | bad | 0.05 | 0.04 | 70 | bad | 5 |
| 2 | bad | bad | — | — | — | — | — |
| 3 | bad | bad | — | — | — | — | — |
| 4 | bad | bad | — | — | — | — | — |
| 5 | bad | bad | — | — | — | — | — |

Referring to Table 4, evaluation of the storage stability, peel strength, interlayer adhesion, water resistance and gasohol resistance was performed in the above-mentioned manner. With regard to COMPARATIVE EXAMPLES 2 to 5, wherein the samples gelated and could not be applied uniformly, it was impossible to judge their peel strength, interlayer adhesion, water resistance and gasohol resistance, as indicated by "—" in Table 4.

As apparent from Table 2, the samples from EXAMPLES 1 to 14 were superior in storage stability, peel strength, interlayer adhesion, water resistance and gasohol resistance.

In addition, the samples from EXAMPLES 5, 6, 12 and 13, each of which comprised an epoxy group-containing compound, showed an outstanding improvement in peel strength and gasohol resistance.

On the contrary, COMPARATIVE EXAMPLES 1 to 5, as shown in Table 4, proved that use of the acid-modified butene-1 polymer (c) which was not copolymerized with α-olefin other than butene-1 resulted in deficient storage stability, regardless of the kind of organic solvents. Besides, the sample of COMPARATIVE EXAMPLE 1 turned out to be inferior in any aspect of peel strength, interlayer adhesion, water resistance and gasohol resistance.

As evident from the above description, the resin solution composition of the present invention exhibits excellent storage stability, the effect being prominent especially when the storage temperature is low. Moreover, since the acid-modified butene-1/α-olefin copolymer has a low melting temperature, this resin solution composition can ensure remarkable properties of the coating (in particular, superior adhesion property to polyolefins), even after low-temperature baking or heat-sealing is practiced at 100° C. or lower in paint or adhesive applications. For these advantages, this resin solution composition is useful not only for adhesives between a molded article made of polyolefin and a molded article made of polyolefin, metal or resin (e.g. polyesters, polyamides) ides), but also for paints for molded articles made of polyolefins or the like.

This application is based on Application Nos. 2000-381976 and 2001-270330 filed in Japan, the entire content of which is incorporated hereinto by reference.

What is claimed is:

1. A resin solution composition for paints or adhesives which comprises an acid-modified butene-1/α-olefin copolymer obtained by modifying a butene-1/α-olefin copolymer with an unsaturated carboxylic acid or an acid anhydride thereof, wherein the butene-1/α-olefin copolymer comprises 65 to 85 mol % butene-1 component and 15 to 35 mol % α-olefin component as polymerizable components, the α-olefin component having 2 to 8 carbon atoms and being other than butene-1 component, wherein the acid-modified butene-1/α-olefin copolymer has a weight average molecular weight (Mw) in the range of 50,000 to 200,000, wherein the acid-modified butene-1/α-olefin copolymer comprises the unsaturated carboxylic acid or the acid anhydride thereof in a proportion of 0.5 to 5% by weight, and wherein the acid-modified butene-1/α-olefin copolymer is dissolved in an organic solvent, in a solid content of 10 to 30% by weight.

2. The resin solution composition according to claim 1, wherein the acid-modified butene-1/α-olefin copolymer has a melting temperature in the range of 70° C. to 100° C.

3. The resin solution composition according to claim 1, wherein the organic solvent comprises an alicyclic hydrocarbon having 5 to 8 carbon atoms in a proportion of 10 to 90% by weight.

4. The resin solution composition according to claim 1, wherein the organic solvent comprises an aromatic hydrocarbon in a proportion of 10 to 90% by weight.

5. The resin solution composition according to claim 1, which further comprises, as a curing agent, a compound having two or more epoxy groups per molecule.

* * * * *